(No Model.) 2 Sheets—Sheet 1.
J. R. LONG.
TRUCK.
No. 533,069. Patented Jan. 29, 1895.
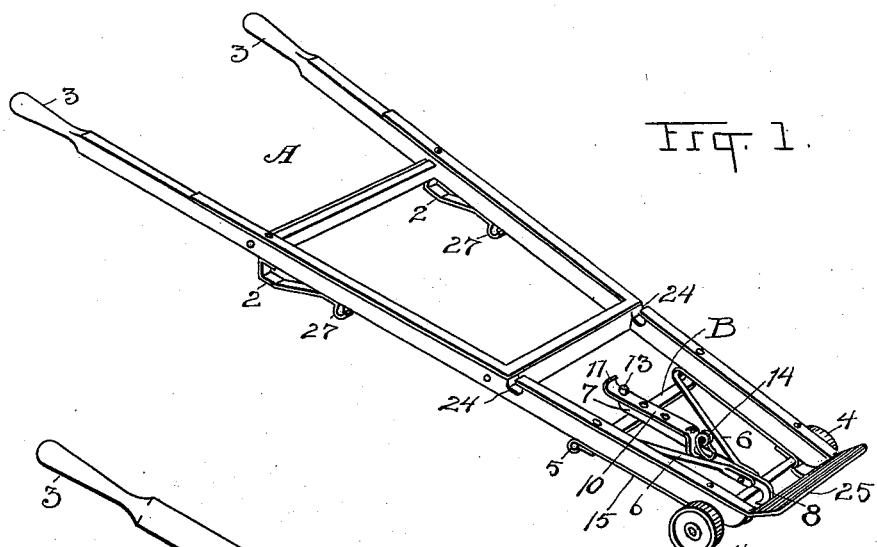
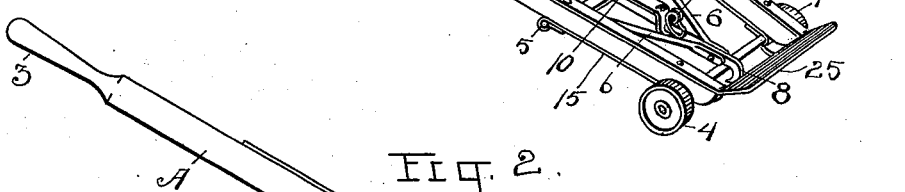
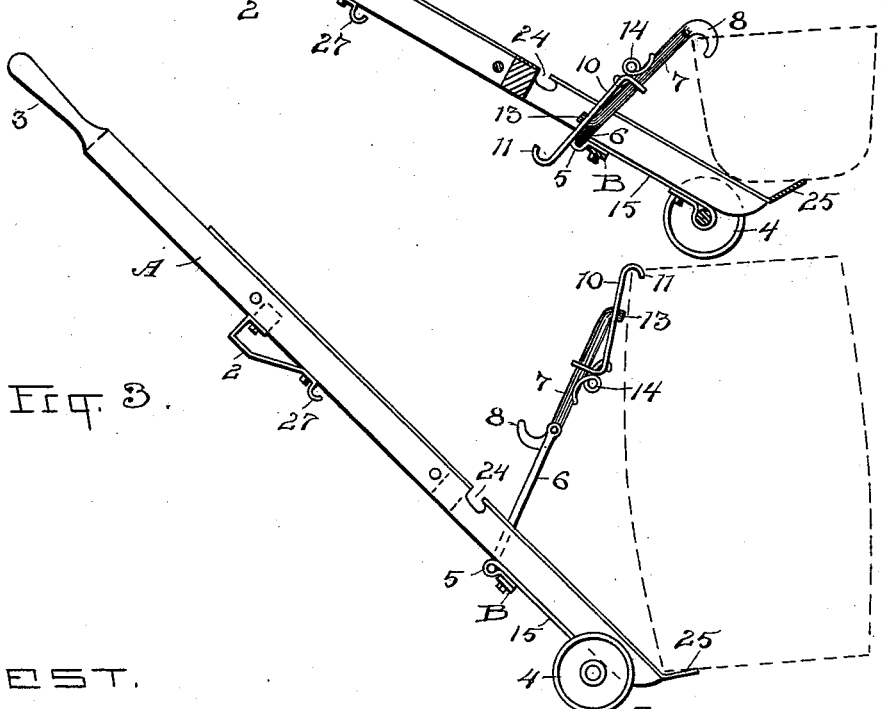
ATTEST.
F. B. Moser.
G. S. Schaeffer.
BY
H. T. Fisher.
ATTORNEY
INVENTOR.
John R. Long

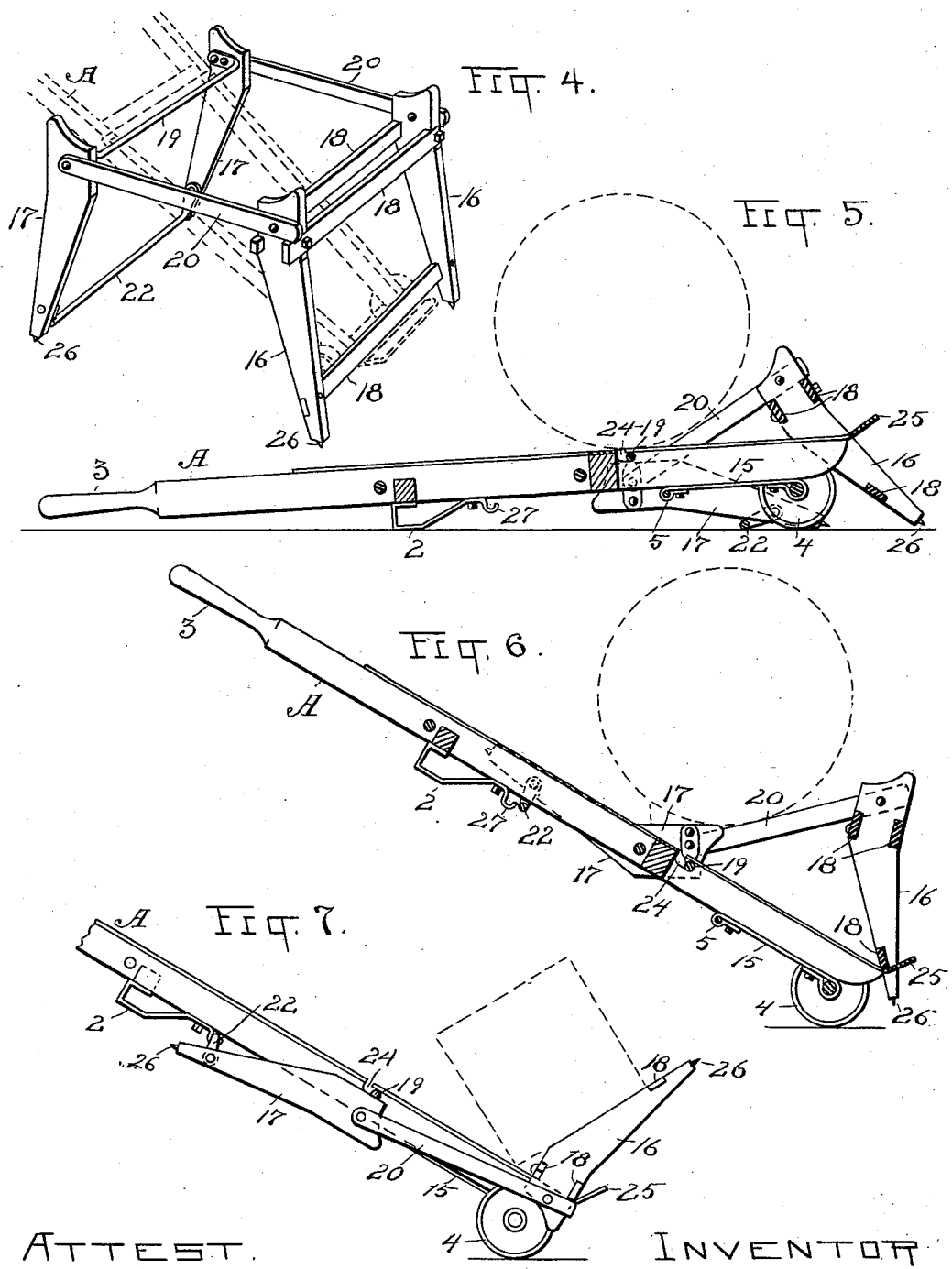

United States Patent Office.

JOHN R. LONG, OF AKRON, OHIO.

TRUCK.

SPECIFICATION forming part of Letters Patent No. 533,069, dated January 29, 1895.

Application filed February 12, 1894. Serial No. 499,908. (No model.)

*To all whom it may concern:*

Be it known that I, JOHN R. LONG, a citizen of the United States, residing at Akron, in the county of Summit and State of Ohio, have invented certain new and useful Improvements in Combination-Trucks; and I do hereby declare that the following is a full, clear, and exact description of the invention, which will enable others skilled in the art to which it appertains to make and use the same.

My invention relates to combination trucks, and the object of the invention is to provide a truck which in the main is of the ordinary construction, but is provided with attachments for handling baskets, barrels, boxes and the like, all substantially as shown and described and particularly pointed out in the claims.

In the accompanying drawings, Figure 1 is a perspective view of my improved truck, showing the extensible attachment for engaging and holding baskets, barrels and the like with the parts run together and folded down out of the way, as it is when not in use. Fig. 2 is a longitudinal central sectional elevation of the truck, showing the extensible arm raised and in position to engage a basket, which is shown in dotted lines. Fig. 3 is a side elevation of the truck showing the extensible arm elongated as it appears when it engages a barrel, which is shown in dotted lines. Fig. 4 is a perspective elevation of a folding adjustable frame, adapted to be combined with the truck and showing the truck in dotted lines. Fig. 5 shows a longitudinal section of truck and frame combined and lying down as when the barrel is rolled thereon. Fig. 6 is a sectional elevation of the truck and the frame combined, and shown as carrying a barrel. Fig. 7 is a side elevation of the truck with the frame as it appears when the parts are used to carry boxes. The extensible arm is omitted from Figs. 5 to 7 to make those views more clear.

A represents the frame of the truck which in itself is substantially like the ordinary truck in appearance and construction, but provided with certain details and parts which adapt it to use as contemplated in my invention. Thus, for example, we have the low brackets or feet —2— near its top, which are made to rest on the floor and take the weight of the load, insofar as the upper part of the truck is concerned, and thus relieve the handles —3— to be readily taken hold of when the truck is to be raised. It will, therefore, occur when a barrel is to be rolled on the truck and carried in the way shown in Fig. 5, that the weight will rest upon the feet —2— and the wheels —4— and leave the handles free to be gripped.

It is well known that the ordinary warehouse truck is not adapted to take hold of a barrel, basket or the like to carry the same from point to point without in some way getting the article bodily upon the truck, where it may balance itself. In the case of a basket it is bodily lifted by hand and set upon the truck, and in the case of a barrel it is rolled or otherwise gotten into place by hand, but has no support but its base. I have devised means for holding either or both of these and kindred articles so that they may be picked up by the truckman without the use of his hands except to adjust the holder thereto, and carried from one place to another wherever the truck can be wheeled, and be readily loaded and unloaded without any special pains or labor or time to do the work. To this end I employ a cross-bar B fixed to the under side of the truck, and pivoted upon this truck in the ears —5— are two supporting arms —6— between which is pivoted a hook bar —7— near its hook end. This bar can be used directly by means of its hook —8— to engage a basket or other low article, as seen in Fig. 2, but in case the article be higher, as the barrel shown in Fig. 3, the hook bar —7— is thrown into reverse position, as seen in Fig. 3, and the extensible part —10— is moved into position to engage the barrel. This part likewise has a hook —11— and at its opposite end is bent at right angles and perforated and adapted to slide on the hook rod —7—. The end —13— of said rod is bent at right angles at its end to engage in any one of the several holes in the part —10—, and a spring —14— keeps the part —10— engaged on said extremity —13— in any position of adjustment. It follows, therefore, that the part —10— may be slid up and down within the limits thereof upon the part —7— and thus make the arm as a whole extensible to suit the elevation of the article to be trucked, whether it be a barrel or some other article of greater or less elevation. When the parts are out of use so that the truck may be employed as ordinarily or in other combinations, they are folded down into the position seen in Fig. 1, where they come altogether beneath the working surface of the frame A.

In the foregoing construction for purposes of strength and the like, I employ pieces of strap metal —15— which are bent back upon themselves to form bearings for the wheels —4—, and the ears —5— in which the brace-rods —6— are pivoted.

Now, in order that the truck may be further utilized in combination to make it more generally available and convenient for all its possible uses, and in order that labor and time may be saved, I have constructed the frame seen in Fig. 4. This frame consists of two sections having four legs —16— and —17—, respectively, and connected rigidly by cross-bars and rods —18— and —19— and the sections pivotally by the side bars —20—; that is, the bars —20— are pivotally attached to the legs —16— so as to have a limited movement thereon, the limitations being fixed by the outwardly extending ends of the bars —18—, while at the other end the said bars —20— are so connected with the legs —17— that the said legs are free to turn into any position desired in relation thereto, as seen, for example, in Fig. 7. At their bottom the legs —17— are connected by a rod —22— which is bent at right angles at its ends and pivoted through said extremities to the legs so that it may serve the further purpose of the invention, as hereinafter further disclosed. Now, having a frame of this kind, I design to utilize it in the carrying of barrels, boxes and the like, and two such uses are disclosed in Figs. 6 and 7, respectively. In Fig. 6 I show its position in handling a barrel. In this case the barrel is on the truck and the handle end is raised to such elevation as ordinarily in wheeling a truck. We may assume that primarily the frame and the truck are placed in the relation seen in Fig. 4, and when the rod —19— has been dropped into the notches —24— the legs —17— are swung under and thrown into the position seen in Fig. 6. Then the legs —16— are caught up by engaging toe —25— on cross-bar —18— and raised, and legs —17— are carried back and suspended as in Fig. 6, if the barrel is to be wheeled away; or, as in Fig. 5 the barrel may be set up on the frame by raising the handle of the truck and adjusting the legs of the frame. The barrel is rolled over the handles on and off the truck. When the truck is raised, as in Fig. 6, the barrel may be carried to any desired place, and in order that it may be kept in a raised position so as to put it under tap and draft, as in the case of vinegar, molasses and other barrels, the handles of the truck are elevated sufficiently to rest the extremities of the legs —16— on the floor and to swing the legs —17— into supporting position when the truck may be withdrawn and the frame stands as in Fig. 4. The barrel will rest upon the curved upper extremities of the legs —16— and —17—, and then the truck itself may be bodily withdrawn by disengaging the cross-rod —19— from the notches —24—. Sharp points —26— on the bottom of the legs prevent their spreading. The barrel can be left in that position as long as desired, and then when it is to be taken down the operation is simply reversed and the parts are restored to their original position by first placing the truck in the proper position within the frame, engaging the cross-bar —19— in its notches, raising the handle ends of the truck sufficiently to swing the legs —17— under, and getting the lip —25— under the cross-bar —18— and bringing all the parts back to the place shown in Fig. 6. The barrel can then be rolled off or hauled to any desired place, and another barrel put upon the frame in its stead, or the frame may be otherwise used, as may be desired.

In Fig. 7 we see the frame in a reversed position upon the truck with the legs —16— inverted, while the legs —17— are thrown back in the opposite direction from what is seen in Fig. 6, and the cross-rod —22— engages in the notches —27—, while the rod —19— is again in the notches —24—. If desired, in this case, the handle end of the truck may be raised sufficiently to remove the box forward off the legs —16—, and the box may be brought onto the truck from that end as well as over the handles.

Obviously, the combinations may be still further extended, but enough is shown to disclose the invention, and, obviously, also, the parts may be varied more or less in construction and still serve the same purpose. I do not, therefore, wish to consider the invention as limited to the structural details shown and described, but the invention is as broad as herein claimed.

The extensible arm for baskets, barrels and the like enables a grocery-man to use a truck to carry those articles from place to place in the store without personally lifting or handling them, and this is a great saving in strength and labor.

Having thus described my invention, what I claim is—

1. The convertible four legged frame to support barrels in a raised position, consisting of two sections connected by side links pivoted to said sections at their top, in combination with a truck having catches on its top to engage a cross piece on one of said sections, substantially as set forth.

2. The convertible frame, consisting of two rigid sections having two legs each and side links connecting the sections pivotally at their top, and stops on one of said sections to limit its pivotal movement in respect to the said side links, and a cross rod connecting the legs of the other section rigidly at their top, in combination with a truck having notches in its side bars to engage said cross rod, substantially as set forth.

3. The truck, in combination with an extensible and reversible hook mechanism having a hook at each end to engage a barrel and the like, substantially as set forth.

4. The truck and a reversible and extensible hook mechanism for holding freight, consisting in the converging pivoted supporting arms, a hook bar pivoted in said arms at one end and an adjustable hook on the other end of said hook bar, substantially as set forth.

5. A truck having the usual wheels and side bars with notches —24— and cross piece —25—, in combination with a convertible frame having four legs and constructed with cross rod —19— at its top to engage in notches —24— and cross piece —18— to engage on piece —25—, substantially as set forth.

6. The truck, in combination with a convertible carrying frame, consisting of two rigid sections having two legs each and said sections pivotally connected, and provided with cross pieces —18—, —19— and —22— and the truck provided with catches to make temporary engagement with said frame through said cross pieces, substantially as set forth.

Witness my hand to the foregoing specification this 5th day of February, 1894.

JOHN R. LONG.

Witnesses:
S. D. HOOVER,
C. S. COBBS.